(12) United States Patent
Uhlenhake (10) Patent No.: US 10,006,345 B2
(45) Date of Patent: Jun. 26, 2018

(54) MIXED FLOW TWIN SCROLL TURBOCHARGER WITH SINGLE VALVE

(71) Applicant: BorgWarner Inc., Auburn Hills, MI (US)

(72) Inventor: Gregory D. Uhlenhake, Arden, NC (US)

(73) Assignee: BorgWarner Inc., Auburn Hills, MI (US)

( * ) Notice: Subject to any disclaimer, the term of this patent is extended or adjusted under 35 U.S.C. 154(b) by 350 days.

(21) Appl. No.: 14/653,967

(22) PCT Filed: Dec. 2, 2013

(86) PCT No.: PCT/US2013/072595
§ 371 (c)(1),
(2) Date: Jun. 19, 2015

(87) PCT Pub. No.: WO2014/099330
PCT Pub. Date: Jun. 26, 2014

(65) Prior Publication Data
US 2015/0315961 A1    Nov. 5, 2015

Related U.S. Application Data

(60) Provisional application No. 61/740,775, filed on Dec. 21, 2012.

(51) Int. Cl.
*F02B 37/12* (2006.01)
*F02B 39/08* (2006.01)
*F02B 37/18* (2006.01)

(52) U.S. Cl.
CPC ............ *F02B 37/12* (2013.01); *F02B 37/183* (2013.01); *F02B 39/08* (2013.01); *F02B 2037/122* (2013.01); *Y02T 10/144* (2013.01)

(58) Field of Classification Search
CPC ........ F02B 37/12; F02B 39/08; F02B 37/183; F02B 2037/122; Y02T 10/144
(Continued)

(56) References Cited

U.S. PATENT DOCUMENTS 3,557,549 A * 1/1971 Webster ............... F01D 17/148
415/147
4,008,572 A * 2/1977 Woollenweber, Jr. .... F01D 9/02
415/205
(Continued)

FOREIGN PATENT DOCUMENTS

CN    101694178 A *  4/2010  .............. F02B 37/24
GB    2062116 A *  5/1981  ............. F01D 9/026
(Continued)

OTHER PUBLICATIONS

Chinese Office Action (with English language translation) dated Aug. 14, 2017, in Chinese Application No. 201380064229.5.

*Primary Examiner* — Jason Newton
(74) *Attorney, Agent, or Firm* — Eric L. Doyle; Stephan A. Pendorf; Patent Central LLC (57) ABSTRACT

A turbocharger (100) has an asymmetric, twin scroll volute design, having a first volute (101) and a larger second volute (102). The larger second volute (102) eliminates the need for a wastegate and its associated actuator. The smaller first volute (101) is sized for rapid transients and rated torque, while the second volute (102) is sized such that the turbine inlet pressure is satisfactory for rated power. Furthermore, the turbocharger (100) preferably incorporates a mixed flow turbine wheel (108) rather than a radial wheel, which allows for a larger wheel size to be used while still maintaining inertia. The turbine housing (103) is improved wherein the first and second volutes (101) and (102) are asymmetric with respect to each other and preferably, are leaned toward the (Continued)

bearing housing to match the axial component of the mixed flow turbine wheel inducer (112).

15 Claims, 8 Drawing Sheets

(58) Field of Classification Search
USPC .......................................................... 60/602
See application file for complete search history.

(56) References Cited

U.S. PATENT DOCUMENTS

| | | | | |
|---|---|---|---|---|
| 4,512,714 | A * | 4/1985 | Kaesser | F01D 9/026 415/151 |
| 4,730,456 | A * | 3/1988 | Tadokoro | F01D 17/18 251/298 |
| 4,776,168 | A * | 10/1988 | Woollenweber | F01D 17/141 60/602 |
| 5,560,208 | A * | 10/1996 | Halimi | F02B 37/025 60/600 |
| 5,867,987 | A * | 2/1999 | Halimi | F02B 37/025 60/602 |
| 6,079,211 | A * | 6/2000 | Woollenweber | F02B 37/025 60/602 |
| 6,256,993 | B1 * | 7/2001 | Halimi | F02B 37/025 60/600 |
| 6,941,755 | B2 * | 9/2005 | Bucknell | F01D 9/026 415/151 |
| 2005/0086936 | A1 | 4/2005 | Bucknell et al. | |
| 2007/0209361 | A1 * | 9/2007 | Pedersen | F01D 9/026 60/602 |
| 2009/0290980 | A1 * | 11/2009 | Higashimori | F01D 17/148 415/205 |
| 2010/0229551 | A1 * | 9/2010 | Wu | F01D 9/026 60/605.1 |
| 2011/0099998 | A1 * | 5/2011 | Serres | F01D 17/105 60/602 |
| 2014/0219786 | A1 * | 8/2014 | Zhu | F01D 9/026 415/151 |
| 2015/0233283 | A1 * | 8/2015 | Smiljanovski | F02B 37/025 60/602 |
| 2015/0315961 | A1 * | 11/2015 | Uhlenhake | F02B 37/12 60/602 |
| 2016/0053676 | A1 * | 2/2016 | Ge | F02B 37/025 60/602 |
| 2017/0218836 | A1 * | 8/2017 | Higashimori | F02B 37/04 |
| 2017/0254214 | A1 * | 9/2017 | Higashimori | F01D 17/145 |
| 2017/0261109 | A1 * | 9/2017 | Yanagida | F16K 1/2014 |

FOREIGN PATENT DOCUMENTS

| | | |
|---|---|---|
| JP | 2006348894 | 12/2006 |
| JP | 2012097699 | 5/2012 |
| KR | 1020110062189 | 6/2011 |

* cited by examiner

MIXED FLOW TWIN SCROLL TURBOCHARGER WITH SINGLE VALVE

CROSS-REFERENCE TO RELATED APPLICATION

This application claims priority to and all benefits of U.S. Provisional Application No. 61/740,775, filed on Dec. 21, 2012, and entitled "Mixed Flow Twin Scroll Turbocharger With Single Valve."

FIELD OF THE INVENTION

This invention relates to the field of turbochargers having a multi-scroll turbine housing, and more particularly to a turbocharger having an asymmetric volute turbine housing formed with a plurality of turbine volutes and having a single control valve in a volute divider wall to selectively start and stop exhaust gas flow through one of the volutes.

BACKGROUND OF THE INVENTION

Turbochargers are a type of forced induction system. They deliver air to an engine intake at greater density than would be possible in a normally aspirated configuration. This allows more fuel to be combusted, thus boosting an engine's horsepower without significantly increasing engine weight. A smaller turbocharged engine can replace a normally aspirated engine of a larger physical size, thus reducing the mass and aerodynamic frontal area of a vehicle.

Generally, turbochargers use exhaust flow from an engine exhaust manifold, which enters a turbine housing at a turbine inlet, to drive a turbine wheel, which is located in the turbine casing or housing. The turbine wheel is solidly affixed to one end of a shaft, and a compressor wheel is mounted to the other end of the shaft wherein the turbine wheel provides rotational power to drive the compressor wheel. Once the exhaust gas has passed through the turbine wheel and the turbine wheel has extracted energy from the exhaust gas, the spent exhaust gas exits a turbine exducer of the turbine housing and is ducted to a vehicle downpipe and usually to after-treatment devices such as catalytic converters, particulate traps and $NO_x$ traps. The power developed by the turbine stage is a function of the expansion ratio across the turbine stage, i.e., the expansion ratio from the turbine inlet to the turbine exducer. The range of the turbine power is a function of, among other parameters, the mass flow through the turbine stage.

The compressor stage consists of the compressor wheel and its housing. Filtered air is drawn axially into an inlet of a compressor cover by the rotation of the compressor wheel. The power that is generated by the turbine stage through the turbine wheel is transferred through the shaft to drive the compressor wheel and produce a combination of static pressure with some residual kinetic energy and heat. The pressurized gas exits the compressor cover through a compressor discharge and is delivered, usually via an intercooler, to the engine intake.

In designing the turbine stage, selection of the turbine stage components is made relative to a preferred performance point. Reciprocating internal combustion engines have long been equipped with such turbochargers. In a simple uncontrolled fixed-nozzle turbocharger system, the maximum charging pressure is a function of the strength of the engine. The uncontrolled turbocharger must thus be so designed that the optimal performance is reached only at high engine speeds. However, at other speed regions the turbocharger provides suboptimal boost or air volume to the engine.

Controlled turbochargers provide improved performance, in that the turbine optimal operating point can be reached at low or medium engine speeds. In a simple controlled system, when the flow rate of exhaust gases increases and the turbocharging pressure becomes too high, part of the exhaust gases are simply discharged into the surrounding atmosphere through a wastegate so as to bypass the turbine, whereby damage to the engine due to excessive boost at high speeds can be avoided. However, since exhaust gases bypass the turbine through the wastegate, energy losses are higher and the engine performance drops at high speeds.

It is also known to provide multiple flow conduits within a single turbine casing or housing, such that the exhaust gas flow through the single turbine casing and the turbine performance can be controlled to perform alternately as a low pressure and a high pressure turbine. In one example, these casings can be classified as a twin scroll or twin-flow casing.

In a twin-flow casing the spiral turbine casing is divided by at least one radial partition into two axially adjacent spirals. The exhaust gas of each spiral enters the turbine wheel inlet to impact the periphery of the turbine wheel, with axially adjacent spiral conduits impacting axially adjacent segments of the turbine wheel.

The selection or operation of the spirals can be controlled via a gate valve (throttle valve, flap, slide valve) which enlarges flow cross section with increasing turbocharger speed. A control device is generally provided with sensing means for sensing boost pressure or speed, and an adjustment member for actuating the gate valve.

As one example of a turbocharger, U.S. Pat. No. 6,652,224 (Mulloy et al.) discloses a variable geometry turbine which includes a radial turbine wheel with movable nozzle vanes controlling flow from a single volute. Similarly, U.S. Pat. No. 6,742,986 (Osako et al.) discloses a turbocharger with a radial turbine, which is formed as a variable displacement turbine to vary the turbine capacity. These designs have increased complexity.

Alternatively, a twin scroll design may be used. U.S. Pat. No. 3,614,259 (Neff) teaches a divided turbine casing which may be used to provide either a pulse turbine or a variable speed turbine, with gas flow controlled via a flapper valve. In the case of an impulse turbine, multiple exhaust gas lines are coupled to the turbine casing, such that the gate valve or flow control means must be of commensurate complexity, controlling flow through two or four or more flow paths.

U.S. Pat. No. 4,544,326 (Nishiguchi et al.) discloses a variable-capacity turbine which defines first and second scroll passages in the turbine scroll passage which supplies exhaust gas to a radial turbine. A rotating valve is provided to selectively open and close the second scroll passage depending upon pressure increases and decreases in exhaust gas flow. Alternatively, U.S. Pat. No. 7,363,761 (Dickerson) discloses a turbocharger with an exhaust gas throttle to control the flow of exhaust to the turbine.

U.S. Pat. No. 5,092,126 (Yano) discloses a twin scroll turbine which uses a radial turbine, a twin scroll structure and a variable nozzle structure. In a first embodiment, a first scroll passage provides a fixed flow capacity, while a second scroll passage provides variable flow through a variable area nozzle unit comprising fixed and movable vanes which control variable flow into the radial turbine from the second scroll passage. In a second embodiment, a control is provided in a first scroll passage so that it is possible to adjust a variable area nozzle unit with the control valve kept closed and then to open up both the variable area nozzle unit and the control valve.

U.S. Pat. No. 6,983,596 (Frankenstein et al.) discloses a controlled turbocharger having a twin-flow design with an integrated bypass using a rotary valve.

Figure 1:
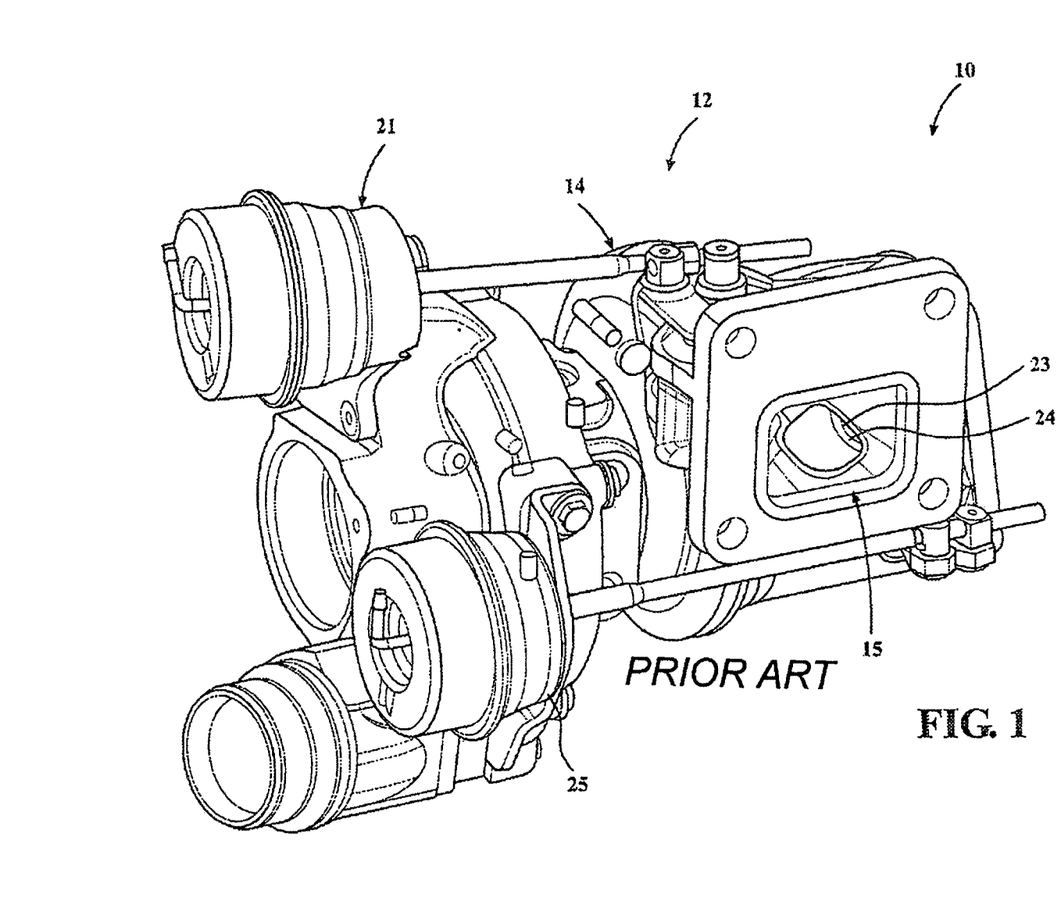
FIG. 1 is a perspective view of a twin scroll turbocharger with a scroll valve and a wastegate valve.

In another design shown in FIG. 1, a twin scroll design may be provided with a first valve and actuator assembly which controls a wastegate while a second valve and actuator assembly controls the flow of exhaust gas into a second scroll which can be selectively opened and closed. However, the provision of two valve and actuator assemblies increases the overall cost and complexity of the turbocharger and can result in inefficiencies in turbocharger operation due to the use of the wastegate structure.

It is an object of the present invention to therefore overcome disadvantages associated with these turbochargers.

SUMMARY OF THE INVENTION

The present invention relates to an improved turbocharger which has less parts and costs. The inventive turbocharger has an asymmetric, twin scroll volute design with a single volute valve provided to selectively control exhaust gas flow through a second volute during higher engine speeds. This differs in comparison to a twin scroll design which includes an additional second valve and actuator assembly for controlling wastegate flow.

More particularly, the inventive turbocharger uses a first volute or scroll, which has a first size and is normally open, and a second volute or scroll, which has a second size larger than the first volute and is selectively opened and closed by the single volute valve. This twin scroll design provides the twin scrolls in an asymmetric configuration wherein the larger, second volute eliminates the need for a wastegate and its associated actuator valve assembly. The small volute is sized for rapid transients and rated torque, while the larger volute is sized such that the turbine inlet pressure is satisfactory for rated power.

Furthermore, the turbocharger preferably incorporates a mixed flow turbine wheel rather than a radial wheel, which allows for a larger wheel size to be used in comparison to the size of a radial wheel while still maintaining inertia. The mixed flow design therefore has the volutes formed to be asymmetric in size and orientation relative to the mixed flow wheel. Also, the efficiency of the mixed flow wheel falls of less quickly as the Area/Radius (A/R) is increased once the volute valve is opened and the second volute becomes operational.

To accommodate the mixed flow wheel, the turbine housing is improved wherein the first and second volutes are asymmetric with respect to each other and preferably, are leaned closer to the bearing housing so that the axial flow component from the volutes match the axial component of the mixed flow turbine wheel inducer. By removing the second assembly of a wastegate valve and actuator, the inventive turbocharger therefore uses only the single volute valve and associated actuator while the turbine housing and the volutes thereof become asymmetric due to the larger size of the second volute. This provides significant performance advantages to the inventive turbocharger.

Other objects and purposes of the invention, and variations thereof, will be apparent upon reading the following specification and inspecting the accompanying drawings.

BRIEF DESCRIPTION OF THE DRAWINGS

The present invention is illustrated by way of example and not limitation in the accompanying drawings in which like reference numbers indicate similar parts, and in which.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

As will be described herein, the invention relates to an improved twin-scroll construction which has an asymmetric volute design with a single valve provided to selectively control flow through a second volute. This provides improved performance in comparison to a twin scroll design which includes a second valve for controlling the wastegate flow.

Figure 2:
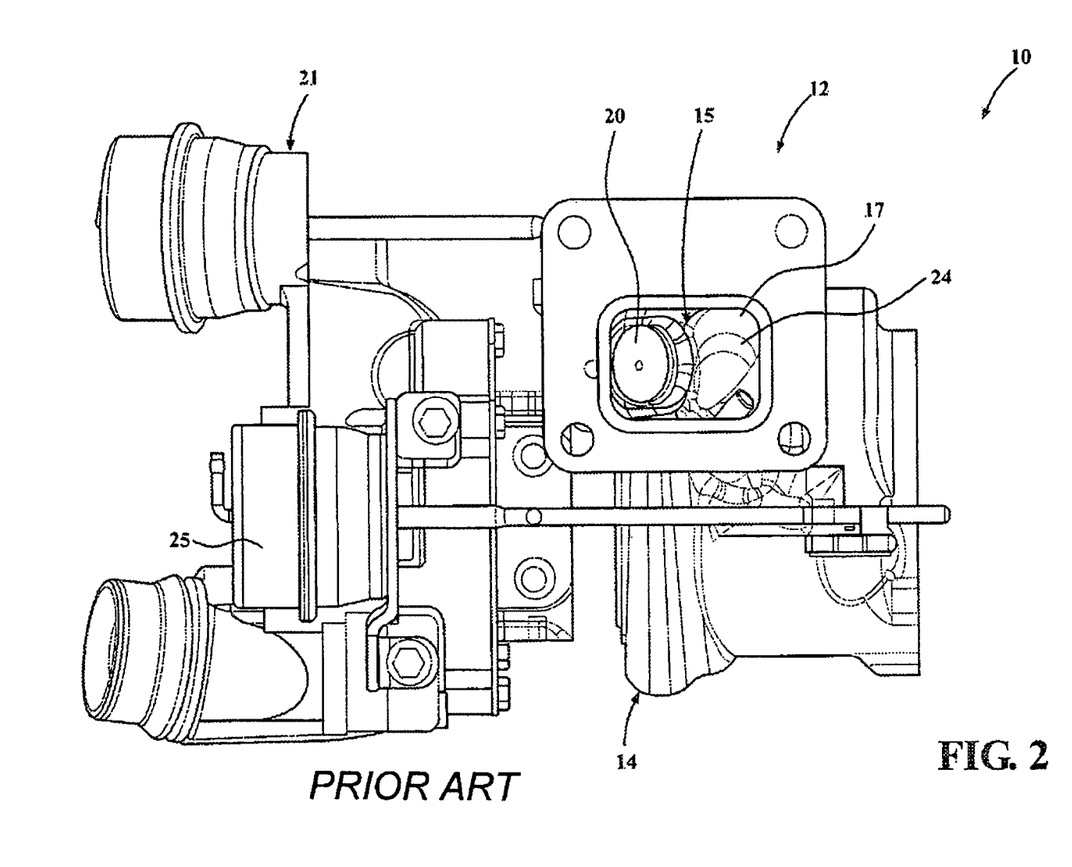
FIG. 2 is a side view of the turbocharger of FIG. 1.

Referring to a known twin scroll design of FIGS. 1 and 2, a turbocharger 10 is shown which has a variable twin scroll turbine (VTST) design wherein the turbine stage is designated by reference numeral 12. The turbine stage 12 includes a turbine housing or casing 14 which is supplied with exhaust gas through the turbine inlet 15.

The variable twin scroll turbine stage 12 furthermore is shown in FIGS. 3-6 and the following discussion generally references these figures. As seen in FIGS. 3-6, the housing 14 is a twin scroll design which defines first and second volutes 17 and 18 which are axially adjacent to each other and separated by a volute divider wall 19 as best seen in FIGS. 3-6. Generally, the first volute 17 is normally open and the second volute 18 is selectively openable and closable by a first valve assembly 20 which is provided in the divider wall 19 disposed between the two volutes 17 and 18. The first valve assembly 20 is operated by a first actuator 21 (FIGS. 1 and 2) which pivots the first valve assembly 20 between the open condition of FIGS. 3 and 5, and the closed condition of FIGS. 2 and 4. The first valve assembly 20 is also referenced herein as the volute valve assembly 20.

The VTST turbocharger 10 operates the volute valve 20 so as to open and close which effectively changes the A/R of the turbine housing 14. More particularly, as seen in FIGS. 2 and 4, the volute valve assembly 20 is shown in the closed position wherein the exhaust gas is only routed into the normally-open first volute 17 through the turbine inlet 15. The exhaust gas flow is restricted to the first volute 17 due to the closed condition of the volute valve 20. The volute valve 20 also is pivotable to the open condition of FIGS. 3 and 5 wherein exhaust gas now is flowable into the second volute 18. This alters the flow capacity of the turbine stage 12, wherein the operation of the volute valve 20 by the actuator 21 (FIGS. 1 and 2) and the provision of twin scrolls 17 and 18 alters the flow capacity of the turbine stage 12 and the power thereof.

Figure 3:
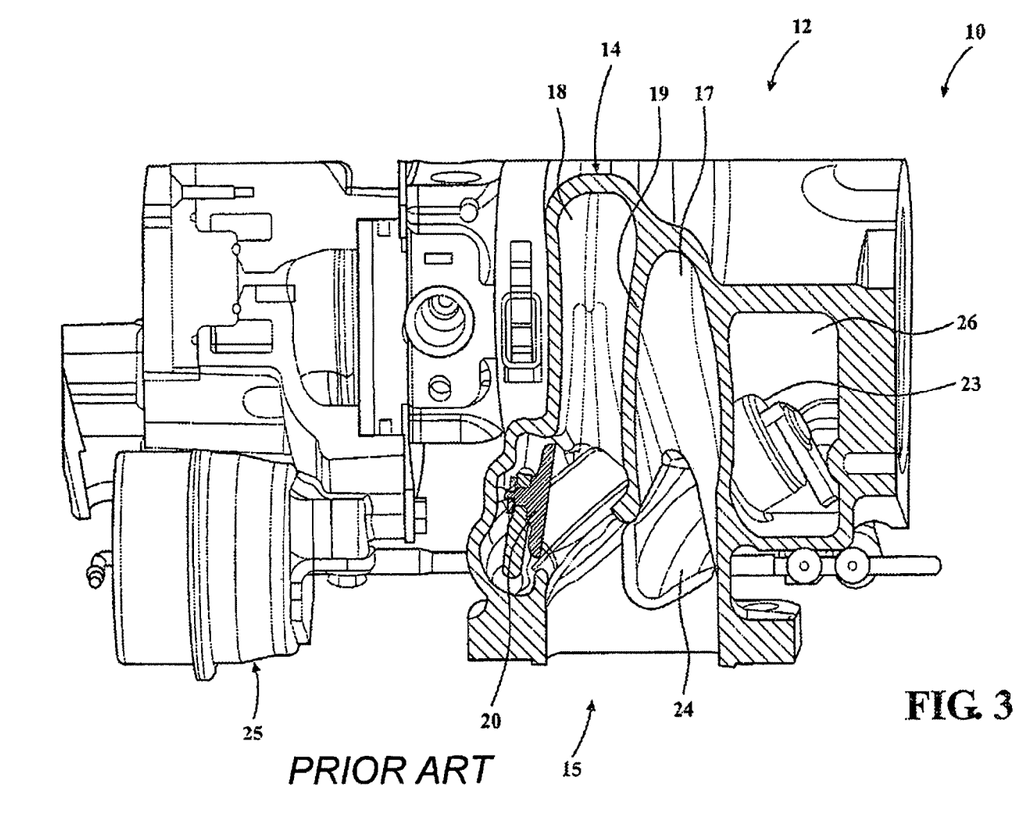
FIG. 3 is an enlarged cross-sectional view of the turbocharger of FIG. 1 wherein the scrolls are of similar size.
Figure 4:
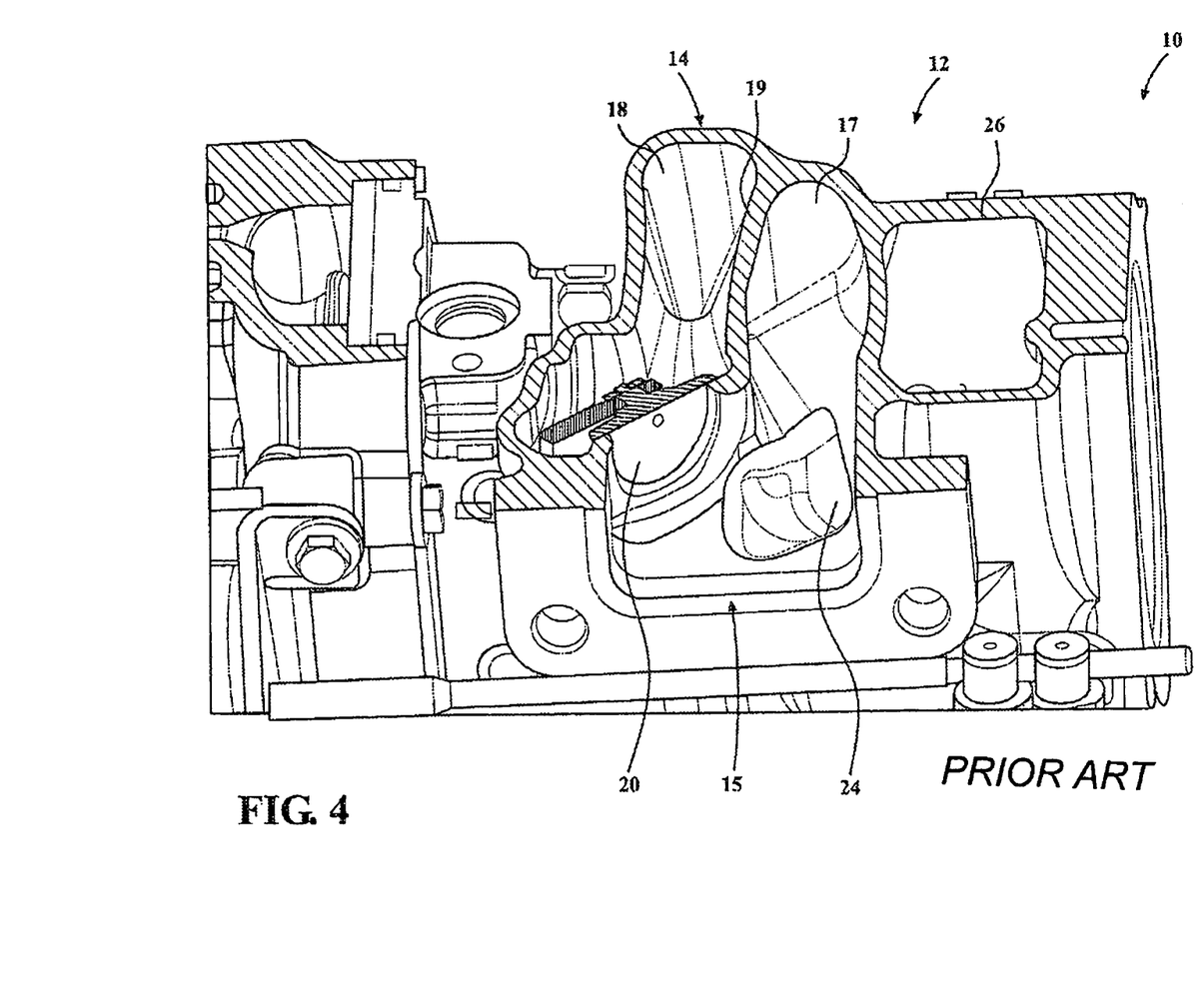
FIG. 4 is a perspective view corresponding to FIG. 3 showing the scroll valve closed.
Figure 5:
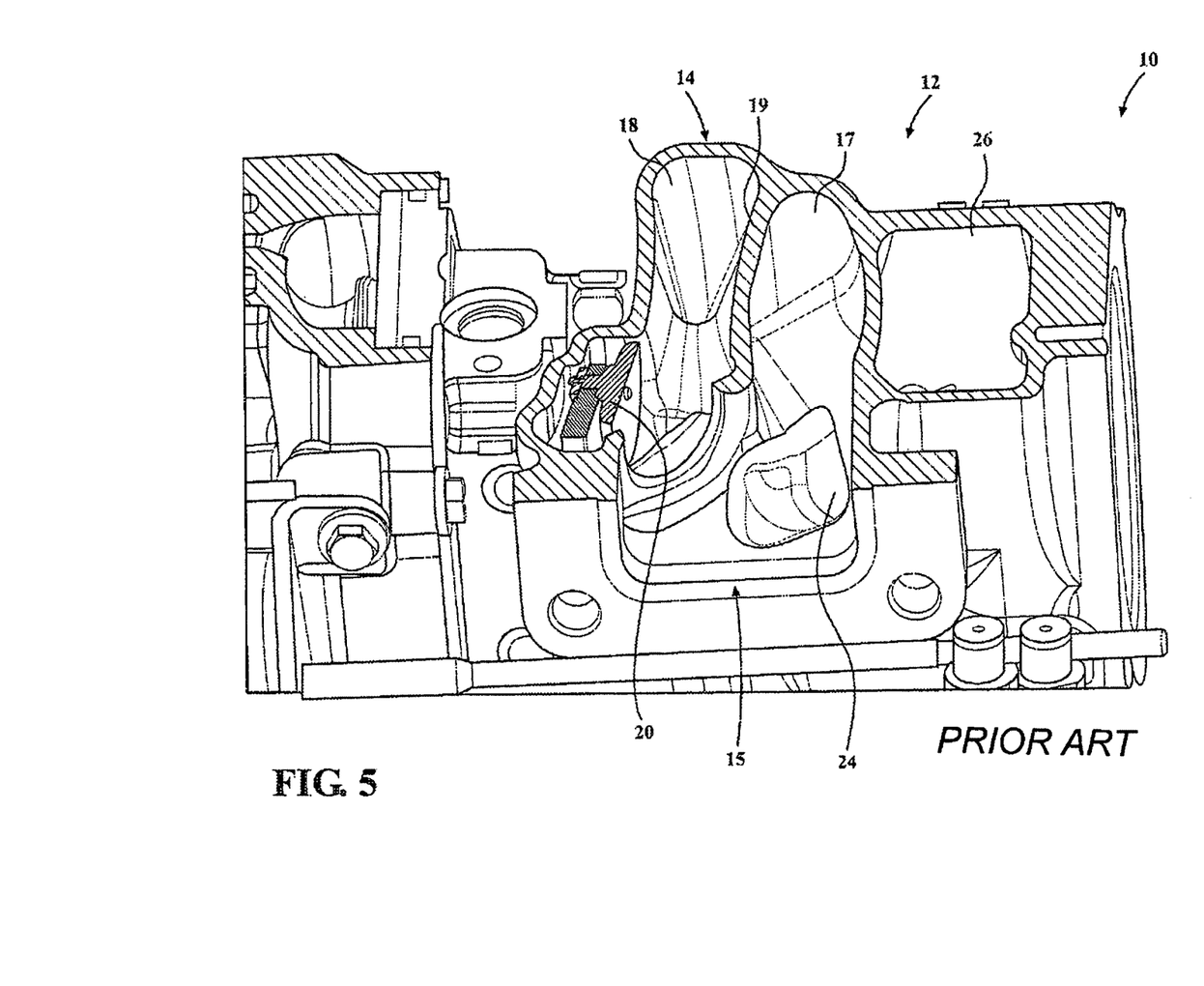
FIG. 5 shows the scroll valve of FIG. 4 in an open condition.

A second valve assembly 23 (FIG. 3) is provided in open communication with the first volute 17 through a wastegate passage 24 (FIGS. 1-3). This second valve assembly 23 is also referenced herein as a wastegate valve 23 which wastegate valve 23 is selectively openable and closable during operation of the turbocharger 10. The wastegate valve 23 is operated by a second actuator assembly 25 (FIGS. 1 and 2) so as to selectively open and close the wastegate valve 23 which selectively permits and prevents a flow of a portion of the exhaust gas into a wastegate outlet 26. Therefore, a controlled portion of exhaust gas is diverted into and may flow through the wastegate passage 24 to the wastegate outlet 26 which in turn flows to a turbine outlet, thereby bypassing the turbine wheel.

This turbocharger 10 with the volute valve 20 and wastegate valve 23 is used to increase turbine power at low engine speeds when the valves 20 and 23 are closed, and to reduce back pressure at higher engine speeds when the valves 20 and 23 are open. This effectively improves the time-to-torque at low speeds and provides fuel efficiency at high speeds.

More particularly, the volute valve 20 is added to the divider wall 19 between the two scrolls 17 and 18 to control turbine flow in response to variations in engine speed. At low engine speeds, the volute valve 20 is closed for the best time-to-torque response. At high engine speeds, the volute valve 20 is opened to decrease the pre-turbine back pressure.

Figure 6:
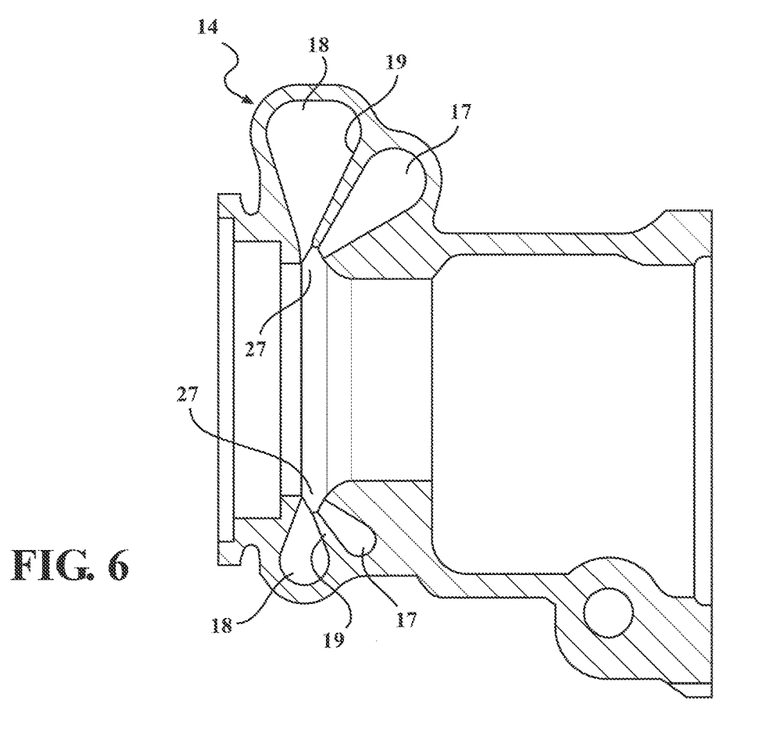
FIG. 6 is a cross sectional view of the turbine housing.
Figure 7:
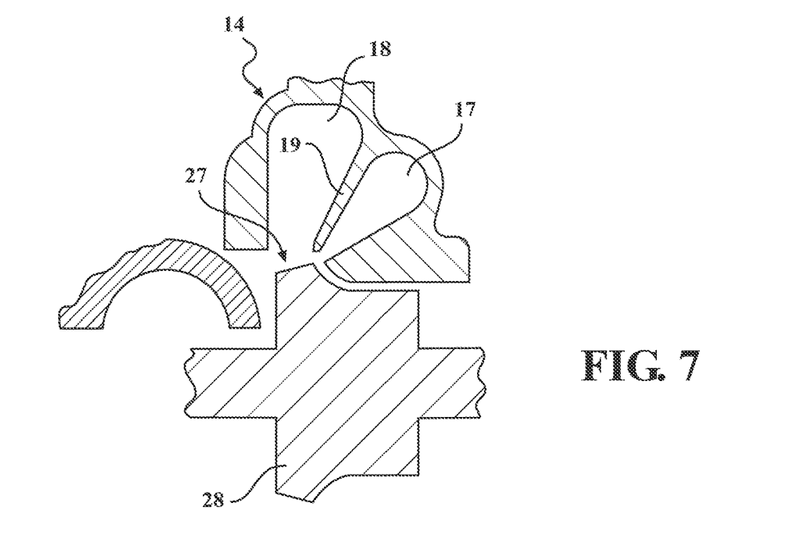
FIG. 7 is a cross sectional view of the turbine housing of FIG. 6 with a radial turbine wheel provided therewith.

Referring to FIGS. 6 and 7, the exhaust gas then flows circumferentially through one or both volutes 17 and 18, and discharges radially through a throat 27 to a radial turbine wheel 28 (FIG. 7). In this manner, the turbine wheel 28 rotates and drives a compressor wheel in a conventional manner.

This design is characterized as a symmetric design wherein the flow area of the volutes 17 and 18 are substantially similar. Typically, the volutes are similar such that the selectively controlled volute 18 is not oversized relative to the volute 17, wherein an oversized volute in such condition could overcharge the turbine wheel 28 (FIG. 7) with gas flow.

Instead, the wastegate passage 24 and wastegate valve 23 is provided to divert excessive flows and once open, stabilizes the exhaust flow through the turbine stage 12. For example, the wastegate passage 24 and wastegate outlet 26 could divert up to 30-40% of exhaust gas flow and bypass the turbine wheel 28.

While this design provides advantages over other known turbocharger designs, this configuration requires the inclusion of the wastegate valve 23 and associated actuator 25 in combination with the volute valve 20 and its associated actuator 21, which increases the total cost of the turbocharger 10. In particular, this turbocharger design has two valve and actuator assemblies, namely the wastegate valve/actuator assembly 23/25, and the volute valve/actuator assembly 20/21, wherein the use of two such assemblies increases the total product cost.

Figure 8:
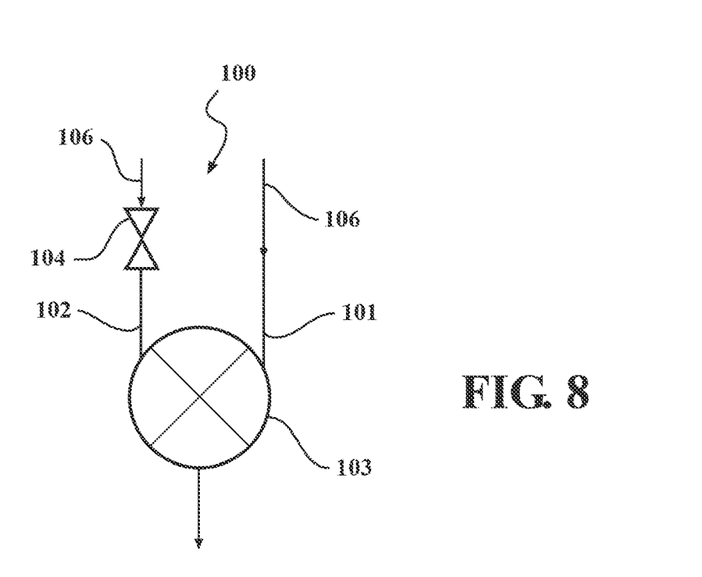
FIG. 8 diagrammatically shows a turbocharger of the invention.

Referring to FIG. 8, however, an inventive turbocharger 100 is diagrammatically shown which includes a smaller sized volute 101 and a larger volute 102 in a twin scroll configuration. The volutes 101 and 102 each discharge into a turbine housing 103. Flow through the volute 102 is controlled by a volute valve 104 that is constructed and operated similar to the volute valve 20 and actuator 21 described above. The volutes 101 and 102 are supplied with exhaust gas through a turbine inlet 106 which is constructed substantially similar to the turbine inlet 15 described relative to FIGS. 1-7. However, the turbocharger 100 eliminates any wastegate valve and actuator assembly 23/25 as well as wastegate passage 24 described above and only provides the single volute valve 104 and its associated actuator assembly.

Figure 9:
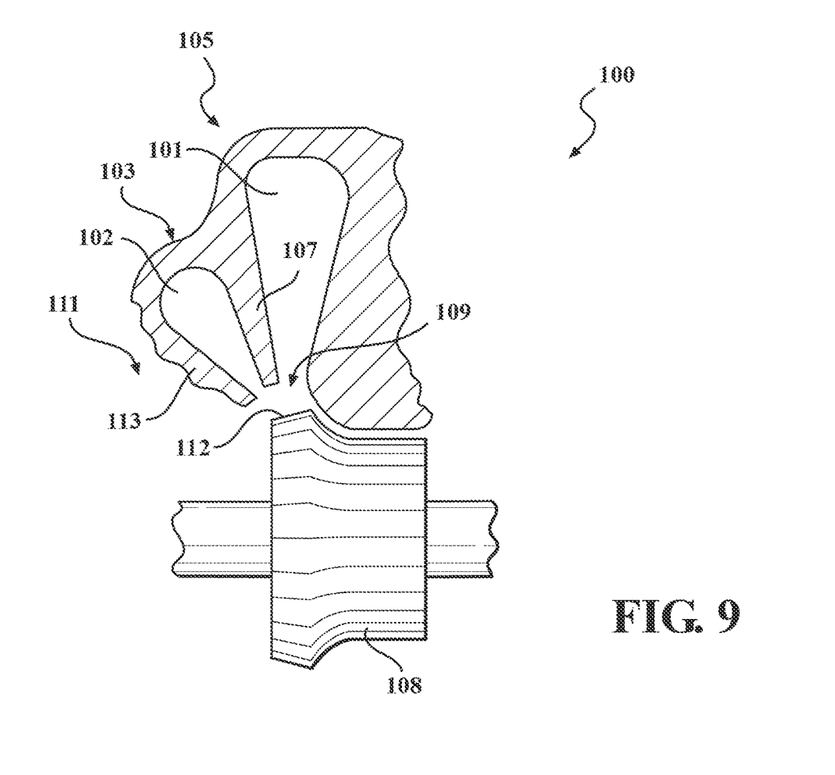
FIG. 9 is a cross-sectional view of the inventive turbocharger.

To account for the loss in wastegate capacity, the size of the inventive turbine housing 103 is increased relative to the wastegated size shown in FIGS. 1 and 6. Referring to FIG. 9, the inventive turbocharger 100 uses the first volute 101 having a first size and second volute 102 having a second size larger than the first volute 101. Preferably, the small volute 101 is sized for rapid transients and rated torque, while the larger volute 102 is sized such that the turbine inlet pressure is satisfactory for rated power which also takes into account the lack of wastegate flow which is not found in the turbocharger 100.

The volutes 101 and 102 are separated axially by a volute divider wall 107 which extends radially inwardly toward a turbine wheel 108. To increase the durability of the divider wall 107, the shape of it can be changed in comparison to a typical twin scroll design. In particular, the divider wall 107 may be made shorter so to provide more tip to wall clearance in the area of a throat 109. Further, the divider wall 107 may be made wider so as to have a greater dividing wall thickness. Removing an acute angle also may improve crack durability.

The turbine housing 103 is made larger so that the volutes 101 and 102 preferably are asymmetrically leaned toward a bearing housing side of the turbine housing 103 so as to have an asymmetric shape defined by the smaller and larger sizes of the volutes 101 and 102. The volutes 101 and 102 open radially inwardly through the throat 109 which opens radially toward the turbine wheel 108. Preferably, the angle of discharge of the volutes 101 and 102 into the throat 109 has both a radially inwardly directed component and an axially directed component which angles away from the bearing housing side of the turbine housing 103. This differs from the angle seen in FIG. 6 for the known turbocharger 10 wherein it can be seen that the volute 17 is angled toward the bearing housing side.

Additionally as to FIG. 9, the preferred turbocharger 100 incorporates the turbine wheel 108 which preferably is formed as a mixed flow turbine wheel rather than the radial wheel 28 of FIG. 7. This allows for a larger wheel size for the mixed flow wheel 108 to be used in comparison to the size of the radial wheel 28 while still maintaining inertia. Also, the efficiency of the mixed flow wheel 108 falls off less quickly as the A/R is increased once the volute valve 104 is opened and the second volute 102 becomes operational in combination with the first volute 101 which is normally open and always operational.

In more detail, to accommodate the mixed flow of the mixed flow wheel 108, the turbine housing 103 is modified in comparison to the turbine housing 14 of FIG. 6. In this regard, the geometric orientation of the first and second volutes 101 and 102 are leaned closer to a bearing housing 111 to match the axial component of a turbine wheel inducer 112. Next, a heat shield 113 may serve to define one side of the throat area 109 and as such, may now become an aerodynamic component directing the discharge of exhaust gas from the volutes 101 and 102 toward the mixed flow turbine wheel 108. Further, in most cases the mixed flow wheel 108 will be the same diameter or larger than the radial wheel 28 to provide equivalent flows of exhaust gas through a turbine stage 105. Additionally, the vertical divider wall of the inducer contour may be machined to improve efficiency.

These changes may be applied to both the twin scroll design of FIGS. 8-9 and even to the variable twin-scroll housing of FIGS. 1-7 to incorporate mixed flow. By avoiding use of a wastegate valve 23 and actuator 25 like that found in the turbocharger 10 of FIGS. 1-7, the inventive turbocharger 100 uses only the volute valve 104 and its associated actuator wherein the turbine housing 103 and the volutes 101 and 102 thereof become asymmetric. The mixed flow design therefore has the volutes 101 and 102 formed to be asymmetric in size and orientation relative to the mixed flow wheel 108 such that the larger volute 102 accommodates rated power and the increased exhaust gas flows which must be handled in the absence of a wastegate.

Efficiency of the mixed flow wheel 108 may drop at larger flows of exhaust gas, but this efficiency drop will be less than the radial wheel 28. Since this drop typically occurs in what would be a wastegate condition in the VTST design of FIG. 1, this wastegate condition results in an efficiency drop in the turbocharger 10 and therefore counterbalances the efficiency drop occurring in the mixed flow wheel 108.

Figure 10:
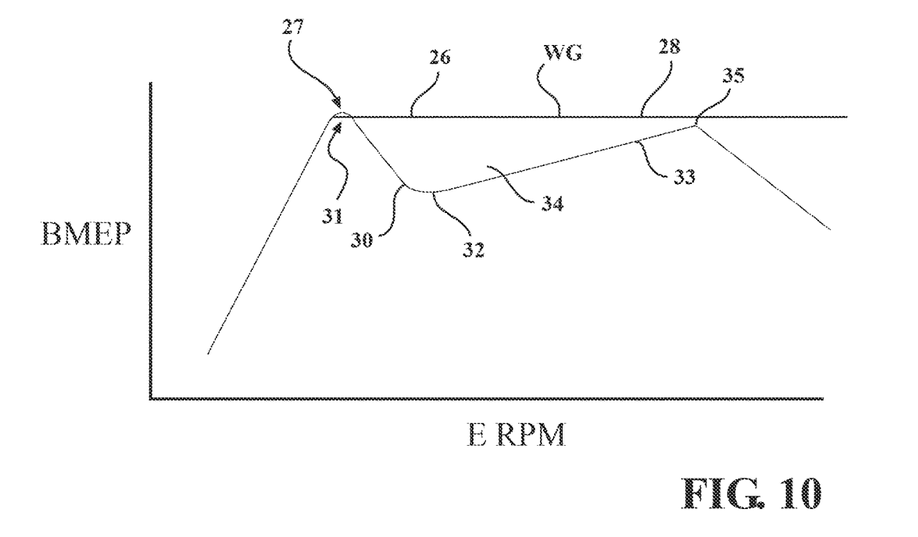
FIG. 10 is a BMEP vs ERPM curve showing a comparison of turbocharger performance.

Referring to FIG. 10, a first curve 26 shows the relationship of BMEP to engine RPM to show the performance characteristics of a wastegated turbocharger to the turbocharger 100 of the invention. The wastegated curve 26 shows a wastegated turbocharger wherein the curve has a steady incline during initial operating conditions as the engine RPM's increase. At location 27, however, the wastegate valve such as valve 23 opens which allows the wastegate flow to bypass the turbine stage and levels off the BMEP levels as indicating by the flat section 28 of curve 26. Thus, the wastegate flow provides an ability to control the turbine stage and thereby control the compressor stage power.

As also seen in FIG. 10, the turbocharger 100 operates such that its single valve curve 30 includes an initial inclined section which essentially overlaps the incline section of the wastegated curve 26. Further, the volute valve 104 may also open at operating point 31 which is similar to the wastegate opening pint 27 of wastegated curve 26. If the volute valve 104 is opened fully, curve 30 shows a valley 32 which eventually bottoms out and then the BMEP begins to increase as shown by incline 33. The area 34 between the curves 26 and 30 may in one sense indicate some loss in overall operational efficiency. However, this is believed to be counterbalanced by the advantages of the single volute valve 104 provided in combination with a large volute 102 which is sized to accommodate the flow that would occur through the volute 18 and wastegate passage 24 of FIG. 4. The second peak 35 generally indicates the peak power point which may be reached at about 5000-5500 rpm.

To further improve efficiency, however, the area 34 between the curves 26 and 30 may be reduced by controlling the opening speed of the volute valve 104. In this regard, the valve 104 may be opened slowing by incrementally or steadily pivoting the valve 104 between the closed and opened positions. As described above, the volute valve 104 may be operated by the actuator 21 described above. Alternatively, the actuator may take the form of an electric controller that controls the speed at which the valve 104 pivots between the open and closed positions and vice versa. An electric actuator and other actuator types could be used to provide closed loop feedback of the degree that the valve 104 has opened. Also, a rotary actuator might be used which can be similar to a four bar linkage, which actuator also provides controlled valve operation. In another example, a pneumatic actuator might be used, preferably with a position sensor to provide closed loop feedback and control of volute valve 104. As a result, the depth of the valley can be reduced to improve efficiency.

Figure 11:
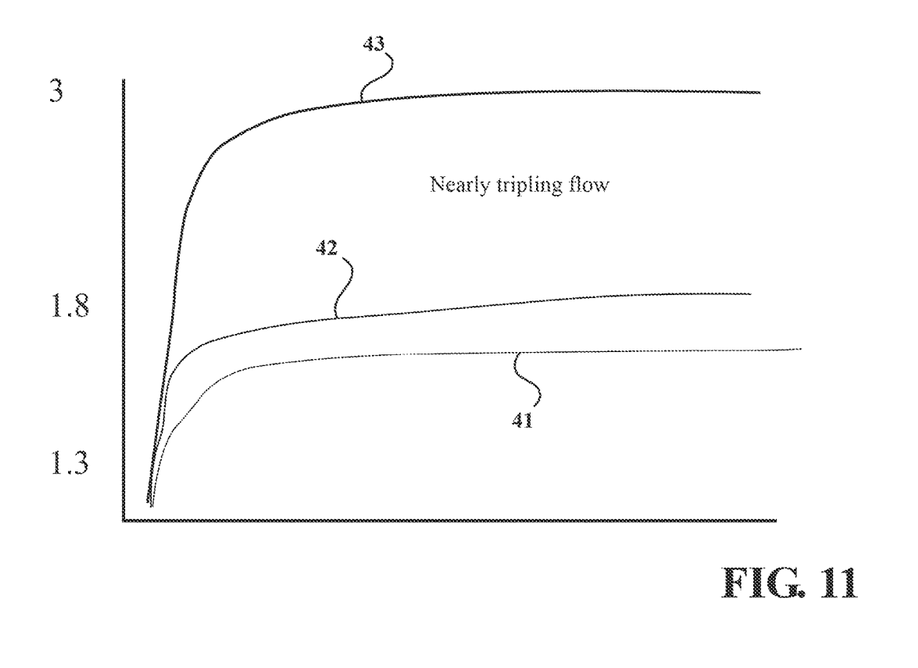
FIG. 11 is a graph showing the improved flow performance of the inventive turbocharger.

Referring to FIG. 11, the wastegate valve when open typically allows 30-40% of exhaust gas to flow therethrough. By eliminating the wastegate valve and providing the inventive combination of small and large volutes 101 and 102, there is expected to be an increase in flow from about 1.3 to about 3 which substantially increases flow through the turbine stage 105. While and increase in flow can be expected, the increase in flow values may also depend upon the typical matching required between the turbocharger and engine.

In more detail, FIG. 11 illustrates estimated flow volumes through the turbine stage 12, 105 for both the wastegated turbocharger 10 and the asymmetric volute turbocharger 100. Essentially, the wastegated turbocharger 10 has three operative conditions wherein: 1) the valves 20 and 23 are both closed so that exhaust flow is limited to volute 17; 2) the valve 20 is open so that both volutes 17 and 18 receive gas flow; and 3) valves 20 and 23 are both open so that gas flow is through volutes 17 and 18 and through wastegate passage 24. In the first condition, the flow volume is represented by curve 41 wherein the peak flow is about 1.3 which curve 41 indicates a volume measurement of the gas flow. In the second condition, the gas flow to the turbine stage 12 passes through volutes 17 and 18 which increases the gas flow as indicated by curve 42 which has a peak flow of about 1.8. In the third condition, gas flow also passes through wastegate passage 24 although this flow bypasses the turbine stage 12 and does not provide any increased flow into the turbine stage 12. As such, curve 41 represents the maximum gas flow which flows through the turbine stage 12 of turbocharger 10.

For the inventive turbocharger 100, the turbocharger 100 has only two operative conditions wherein: 1) the valve 104 is closed so that exhaust flow is limited to volute 101; and 2) the valve 104 is open so that both volutes 101 and 102 receive gas flow. Preferably, the volute 101 is sized similar to volute 17 such that in the first condition, the flow volume is still represented by curve 41 wherein the peak is about 1.3 which indicates a volume measurement of the gas flow through volute 101. In the second condition, the gas flow to the turbine stage 105 passes through volutes 101 and 102 which increases the gas flow to the turbine stage 105. However, in turbocharger 100, there is no wastegate flow such that all of the exhaust gas flow must be accommodated by volutes 101 and 102. Essentially, volute 102 is sized to accommodate flow which is comparable to the combined flow of the volute 18 and wastegate passage 24 described above. As noted previously, volute 102 is sized substantially larger than volute 101 to handle this large flow volume and as a result, the flow is represented by curve 43 which provides a peak volume flow of about 3. This substantially increases the exhaust gas flow which flows to the turbine wheel 112 in comparison to turbine wheel 28, and eliminates the diversion of such flow as wastegate flow. The size of volute 102 is also selected so that curve 43 is high enough so as to avoid increases in backpressure in the turbocharger 100 in comparison to turbocharger 10.

This increased flow is also accommodated by the mixed flow wheel 108. The mixed flow wheel 108 provides for a similar flow through the twin scrolls 101 and 102 but with a lower inertia and better pulse converting design than the radial wheel 28 coupled with a twin scroll as seen in turbocharger 10. The mixed flow wheel 108 may improve time to torque and adding the mixed flow wheel 108 with the asymmetric volutes 101 and 102 allows the wastegate to be eliminated by upsizing the flow without an inertia penalty, which also reduces the cost of the additional valve structure.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A turbocharger (100) comprising:
a turbine housing (103) and a turbine wheel (108) rotatably disposed therein, said turbine housing (103) defining a first volute (101) and a second volute (102), the first volute (101) being smaller in size than the second volute (102), and which are separated from each other by a volute wall (107) in a twin scroll configuration, said first and second volutes (101) and (102) each discharging into said turbine housing (103) toward said turbine wheel (108), and a volute valve (104) being provided in said volute wall (107),
wherein said first and second volutes (101) and (102) are supplied with exhaust gas through a turbine inlet (106) wherein substantially all of said exhaust gas received in said turbine inlet (106) is directed to said first and second volutes (101) and (102), said second volute (102) being selectively closed and opened by said volute valve (104),
wherein all of said exhaust gas initially flows exclusively into said first volute (101) when said volute valve (104) is closed and subsequently a portion of said exhaust gas flows into said second volute (102) when said volute valve (104) is opened,
said turbine housing (103) having an asymmetric shape defined by the smaller and larger sizes of said first and second volutes (101) and (102) respectively which are angled toward said turbine wheel (108), said turbine wheel (108) being formed as a mixed flow turbine wheel, and
wherein said first and second volutes (101) and (102) are asymmetric in size and orientation relative to said mixed flow wheel (108) such that said larger second volute (102) accommodates greater exhaust gas flows in comparison to said first volute (101) and wherein said turbocharger (100) has no wastegate.

2. The turbocharger according to claim 1, wherein said turbocharger is provided downstream of an engine and said first volute (101) is sized for rated torque, while said second volute (102) is sized such that a turbine inlet pressure provides rated power.

3. The turbocharger according to claim 1, wherein said turbocharger (100) has a first operative condition wherein said valve (104) is closed so that exhaust flow is limited to said first volute (101) and a second operative condition wherein said valve (104) is open so that both of said first and second volutes (101) and (102) receive exhaust gas flow.

4. The turbocharger according to claim 3, wherein an angle of discharge of said first and second volutes (101) and (102) directs away from a bearing housing side of said turbine housing (103) and extends into a throat (109) which opens toward said turbine wheel (108), said first and second volutes (101) and (102) discharging through said throat (109) toward said turbine wheel (108) with both a radially inwardly directed component and an axially directed component.

5. The turbocharger according to claim 4, wherein said first and second volutes (101) and (102) are positioned closer to said bearing housing side to match an axial component of said mixed flow turbine wheel (108).

6. A turbocharger (100) comprising:
a turbine stage (105) having
a turbine housing (103),
a turbine wheel (108) rotatably disposed therein,
said turbine housing (103) defining a first volute (101) and a second volute (102), the first volute (101) being smaller in size than the second volute (102), and which are separated from each other by a volute wall (107) in a twin scroll configuration, said first and second volutes (101) and (102) each discharging toward said turbine wheel (108), and
a volute valve (104) provided in said volute wall (107) wherein
said first and second volutes (101) and (102) are supplied with exhaust gas through a turbine inlet (106) wherein substantially all of said exhaust gas received in said turbine inlet (106) is directed to said first and second volutes (101) and (102),
said turbine housing (103) has an asymmetric shape defined by the smaller and larger sizes of said first and second volutes (101) and (102) respectively which are angled toward said turbine wheel (108),
said first and second volutes (101) and (102) are asymmetric in size and orientation relative to said turbine wheel (108) such that said larger second volute (102) accommodates increased exhaust gas flows in comparison to said first volute (101).

7. The turbocharger according to claim 6, wherein said turbocharger (100) is adapted to being operated at a first operative condition wherein said valve (104) is closed so that exhaust flow is limited to said first volute (101) and a second operative condition wherein said valve (104) is open so that both of said first and second volutes (101) and (102) receive exhaust gas flow.

8. The turbocharger according to claim 7, wherein said valve (104) is openable incrementally to control exhaust flow into said second volute (102).

9. The turbocharger according to claim 8, wherein said valve (104) is pivotable between closed and opened positions.

10. The turbocharger according to claim 9, wherein said volute (102) is larger than said volute (101) to handle any exhaust flow not routed through said first volute (101) so that all exhaust flow is directed to said turbine wheel (108).

11. The turbocharger according to claim 10, wherein said turbine wheel (108) is formed as a mixed flow turbine wheel capable of handling said exhaust flow from said first and second volutes (101) and (102), said first and second volutes (101) and (102) discharging toward said turbine wheel (108) with both a radially inwardly directed component and an axially directed component wherein said axially directed component corresponds to an axial flow component of said mixed flow turbine wheel (108).

12. The turbocharger according to claim 11, wherein the axial component of discharge of the volutes (101) and (102) is directed away from a bearing housing end of said turbine housing (103).

13. A turbocharger (100) comprising:
a turbine housing (103) and
a turbine wheel (108) rotatably disposed therein,
said turbine housing (103) defining a first volute (101) and a second volute (102), the first volute (101) being smaller in size than the second volute (102), and which are separated from each other by a volute wall (107) in a twin scroll configuration, said first and second volutes (10.1) and (102) each discharging into said turbine housing (103) toward said turbine wheel (108), and
a volute valve (104) provided in said volute wall (107) wherein said first and second volutes (101) and (102) are supplied with exhaust gas through a turbine inlet (106)
wherein all of said exhaust gas received in said turbine inlet (106) is directed to said first and second volutes (101) and (102), said second volute (102) being selectively closed and opened by said volute valve (104) wherein as said volute valve (104) is moved from a closed position to an open-position all of said exhaust gas initially flows exclusively into said first volute (101) and subsequently a portion of said exhaust gas flows into said second volute (102), said turbine housing (103) having an asymmetric shape defined by the smaller and larger sizes of said first and second volutes (101) and (102) respectively which are angled toward said turbine wheel (108), said turbine wheel (108) being formed as a mixed flow turbine wheel (108) wherein said first and second volutes (101) and (102) are asymmetric in size and orientation relative to said mixed flow wheel (108) such that said larger second volute (102) accommodates rated power and greater exhaust gas flows in comparison to said first volute (101), wherein said turbocharger (100) has no wastegate, said volutes (101) and (102) being asymmetrically leaned toward a bearing housing side of said turbine housing (103) so as to have an asymmetric shape defined by the smaller and larger sizes of the volutes (101) and (102), and said first and second volutes (101) and (102) discharging toward said turbine wheel (108) with both a radially inwardly directed component and an axially directed component wherein said axially directed component corresponds to an axial flow component of said mixed flow turbine wheel (108).

14. The turbocharger according to claim 13, wherein the axially directed component of discharge of the volutes (101) and (102) is directed away from said bearing housing side of said turbine housing (103).

15. The turbocharger according to claim 14, wherein said turbocharger (100) is adapted to operate at a first operative condition wherein said valve (104) is closed so that exhaust flow is limited to said first volute (101) and a second operative condition wherein said valve (104) is open so that both of said first and second volutes (101) and (102) receive exhaust gas flow.

* * * * *